United States Patent
Gosnell

(10) Patent No.: US 8,086,578 B2
(45) Date of Patent: Dec. 27, 2011

(54) DATA ARCHIVING SYSTEM

(75) Inventor: Thomas F. Gosnell, Hudson (CA)

(73) Assignee: Nexsan Technologies Canada Inc., Dorval, Quebec ( * ) Notice: Subject to any disclaimer, the term of this patent is extended or adjusted under 35 U.S.C. 154(b) by 0 days.

(21) Appl. No.: 12/851,824

(22) Filed: Aug. 6, 2010

(65) Prior Publication Data

US 2010/0299315 A1 Nov. 25, 2010

Related U.S. Application Data

(63) Continuation of application No. 11/463,461, filed on Aug. 9, 2006, now Pat. No. 7,801,871.

(60) Provisional application No. 60/706,425, filed on Aug. 9, 2005.

(51) Int. Cl.
G06F 17/00 (2006.01)
(52) U.S. Cl. ........................................ 707/698; 707/747
(58) Field of Classification Search .................. 707/698, 707/747
See application file for complete search history.

(56) References Cited

U.S. PATENT DOCUMENTS

| | | |
|---|---|---|
| 4,319,079 A | 3/1982 | Best |
| 4,731,840 A | 3/1988 | Mniszewski et al. |
| 4,908,861 A | 3/1990 | Bracht et al. |
| 5,001,752 A | 3/1991 | Fischer |
| 5,008,936 A | 4/1991 | Hamilton et al. |
| 5,022,080 A | 6/1991 | Durst et al. |
| 5,189,700 A | 2/1993 | Blandford |
| 5,226,079 A | 7/1993 | Holloway |
| 5,673,316 A | 9/1997 | Auerbach et al. |
| 5,781,629 A | 7/1998 | Haber et al. |
| 5,787,175 A | 7/1998 | Carter |
| 5,818,955 A | 10/1998 | Smithies et al. |
| 5,937,411 A | 8/1999 | Becker |
| 5,940,507 A | 8/1999 | Cane et al. |
| 6,041,334 A | 3/2000 | Cannon |
| 6,064,751 A | 5/2000 | Smithies et al. |
| 6,091,835 A | 7/2000 | Smithies et al. |
| 6,108,783 A | 8/2000 | Krawczyk et al. |
| 6,134,660 A | 10/2000 | Boneh et al. |

(Continued)

FOREIGN PATENT DOCUMENTS

EP 0516898 A1 12/1992

(Continued)

OTHER PUBLICATIONS

International Application No. PCT/CA2006-001312, Written Opinion dated Feb. 5, 2007.

(Continued)

*Primary Examiner* — Mohammad Ali
*Assistant Examiner* — John P. Hocker
(74) *Attorney, Agent, or Firm* — Leslie Anne Kineman; Borden Ladner Gervais LLP

(57) ABSTRACT

An encrypted file storage solution consists of a cluster of processing nodes, external data storage, and a software agent (the "File System Watcher"), which is installed on the application servers. Cluster sizes of one node up to many hundreds of nodes are possible. There are also remote "Key Servers" which provide various services to one or more clusters. The preceding describes a preferred embodiment, though in some cases it may be desirable to "collapse" some of the functionality into a smaller number of hardware devices, typically trading off cost versus security and fault-tolerance.

7 Claims, 2 Drawing Sheets

U.S. PATENT DOCUMENTS

| | | |
|---|---|---|
| 6,292,569 B1 | 9/2001 | Shear et al. |
| 6,327,656 B2 | 12/2001 | Zabetian |
| 6,381,696 B1 | 4/2002 | Doyle |
| 6,553,494 B1 | 4/2003 | Glass |
| 6,578,144 B1 | 6/2003 | Gennaro et al. |
| 6,591,272 B1 * | 7/2003 | Williams .................... 707/1 |
| 6,665,210 B1 | 12/2003 | Harvey |
| 6,704,730 B2 | 3/2004 | Moulton et al. |
| 6,715,050 B2 | 3/2004 | Williams et al. |
| 6,745,327 B1 | 6/2004 | Messing |
| 6,751,632 B1 | 6/2004 | Petrogiannis |
| 6,754,827 B1 | 6/2004 | Cane |
| 6,757,778 B1 | 6/2004 | van Rietschote |
| 6,772,341 B1 | 8/2004 | Shrader et al. |
| 6,775,771 B1 | 8/2004 | Shrader et al. |
| 6,810,398 B2 | 10/2004 | Mounton |
| 6,813,690 B1 | 11/2004 | Lango et al. |
| 6,839,879 B1 | 1/2005 | Hwang |
| 6,928,551 B1 | 8/2005 | Lee et al. |
| 7,136,927 B2 * | 11/2006 | Traversat et al. ............ 709/230 |
| 7,203,753 B2 * | 4/2007 | Yeager et al. ................ 709/225 |
| 2001/0037454 A1 | 11/2001 | Botti et al. |
| 2002/0004800 A1 | 1/2002 | Kikuta et al. |
| 2002/0053021 A1 | 5/2002 | Rice et al. |
| 2002/0095601 A1 | 7/2002 | Hind et al. |
| 2002/0112157 A1 | 8/2002 | Doyle et al. |
| 2002/0129241 A1 | 9/2002 | Doyle et al. |
| 2002/0143704 A1 | 10/2002 | Nassiri |
| 2002/0152374 A1 | 10/2002 | Mayfield |
| 2002/0184217 A1 * | 12/2002 | Bisbee et al. .................... 707/9 |
| 2002/0188605 A1 * | 12/2002 | Adya et al. ...................... 707/4 |
| 2003/0046270 A1 | 3/2003 | Leung et al. |
| 2003/0115204 A1 | 6/2003 | Glenblatt et al. |
| 2003/0154177 A1 * | 8/2003 | Holland et al. ................ 706/60 |
| 2003/0212893 A1 | 11/2003 | Hind et al. |
| 2004/0024919 A1 | 2/2004 | Stager et al. |
| 2004/0039912 A1 | 2/2004 | Borrowman et al. |
| 2004/0044842 A1 | 3/2004 | Trimmer et al. |
| 2004/0044863 A1 | 3/2004 | Trimmer et al. |
| 2004/0049521 A1 | 3/2004 | Borrowman |
| 2004/0054987 A1 | 3/2004 | Sonpar et al. |
| 2004/0153739 A1 | 8/2004 | Trimmer et al. |
| 2004/0162808 A1 | 8/2004 | Margolus |
| 2004/0163029 A1 | 8/2004 | Foley et al. |
| 2004/0167898 A1 | 8/2004 | Margolus |
| 2004/0167901 A1 | 8/2004 | Margolus |
| 2004/0167902 A1 | 8/2004 | Margolus |
| 2004/0167903 A1 | 8/2004 | Margolus |
| 2004/0167913 A1 | 8/2004 | Margolus |
| 2004/0167934 A1 | 8/2004 | Margolus |
| 2004/0167935 A1 | 8/2004 | Margolus |
| 2004/0167938 A1 | 8/2004 | Margolus |
| 2004/0167939 A1 | 8/2004 | Margolus |
| 2004/0167940 A1 | 8/2004 | Margolus |
| 2004/0167943 A1 | 8/2004 | Margolus |
| 2004/0168057 A1 | 8/2004 | Margolus et al. |
| 2004/0168058 A1 | 8/2004 | Margolus |
| 2004/0177058 A1 | 9/2004 | Carpentier et al. |
| 2004/0181628 A1 | 9/2004 | Trimmer et al. |
| 2004/0205112 A1 | 10/2004 | Margolus |
| 2004/0220975 A1 | 11/2004 | Carpentier et al. |
| 2004/0221162 A1 | 11/2004 | Kongtcheu |
| 2004/0255120 A1 | 12/2004 | Botti et al. |
| 2004/0255140 A1 | 12/2004 | Margolus et al. |
| 2005/0015409 A1 | 1/2005 | Cheng et al. |

FOREIGN PATENT DOCUMENTS

| | | |
|---|---|---|
| EP | 0798892 A2 | 10/1997 |
| EP | 0821326 B1 | 1/1998 |
| EP | 1018239 | 7/2000 |
| EP | 1049988 | 11/2000 |
| EP | 1049989 A1 | 11/2000 |
| EP | 1269325 A1 | 1/2003 |
| EP | 1278113 | 1/2003 |
| EP | 1344321 A1 | 9/2003 |
| EP | 1360623 | 11/2003 |
| EP | 1376435 | 1/2004 |
| EP | 1376436 A1 | 1/2004 |
| EP | 1378847 | 1/2004 |
| EP | 1388061 A1 | 2/2004 |
| EP | 1410556 A1 | 4/2004 |
| EP | 1425875 | 6/2004 |
| EP | 1430639 | 6/2004 |
| JP | H09-294120 | 11/1997 |
| JP | 2003-523016 | 7/2003 |
| JP | 2004-110693 | 4/2004 |
| JP | 2004-166241 | 6/2004 |
| WO | 0072504 A2 | 11/2000 |
| WO | 0118633 A1 | 3/2001 |
| WO | 0161438 A3 | 8/2001 |
| WO | 0163385 A1 | 8/2001 |
| WO | 0189133 | 11/2001 |
| WO | 0237689 A1 | 5/2002 |
| WO | 02061575 A2 | 8/2002 |
| WO | 02062007 A1 | 8/2002 |
| WO | 02093314 A2 | 11/2002 |
| WO | 02093389 A1 | 11/2002 |
| WO | 03009520 A1 | 1/2003 |
| WO | 03024018 A1 | 3/2003 |
| WO | 03009200 C1 | 9/2003 |
| WO | 2004053733 A3 | 6/2004 |
| WO | 2004074968 | 9/2004 |
| WO | 2004077203 A3 | 9/2004 |
| WO | 2004079986 A1 | 9/2004 |
| WO | 2004082204 A1 | 9/2004 |
| WO | 2006/134020 | 12/2006 |

OTHER PUBLICATIONS

International Application No. PCT/CA2006-001312, International Search Report dated Feb. 5, 2007.
International Application No. PCT/CA2006-001312, Written Opinion dated Nov. 23, 2007.
International Application No. PCT/CA2006-001312, International Preliminary Report on Patentability dated Dec. 20, 2007.
U.S. Appl. No. 11/463,461 Notice of Allowance dated Apr. 19, 2010.
English Translation of Japanese Patent Application No. P2008-525350 Office Action dated Jun. 28, 2011.

* cited by examiner

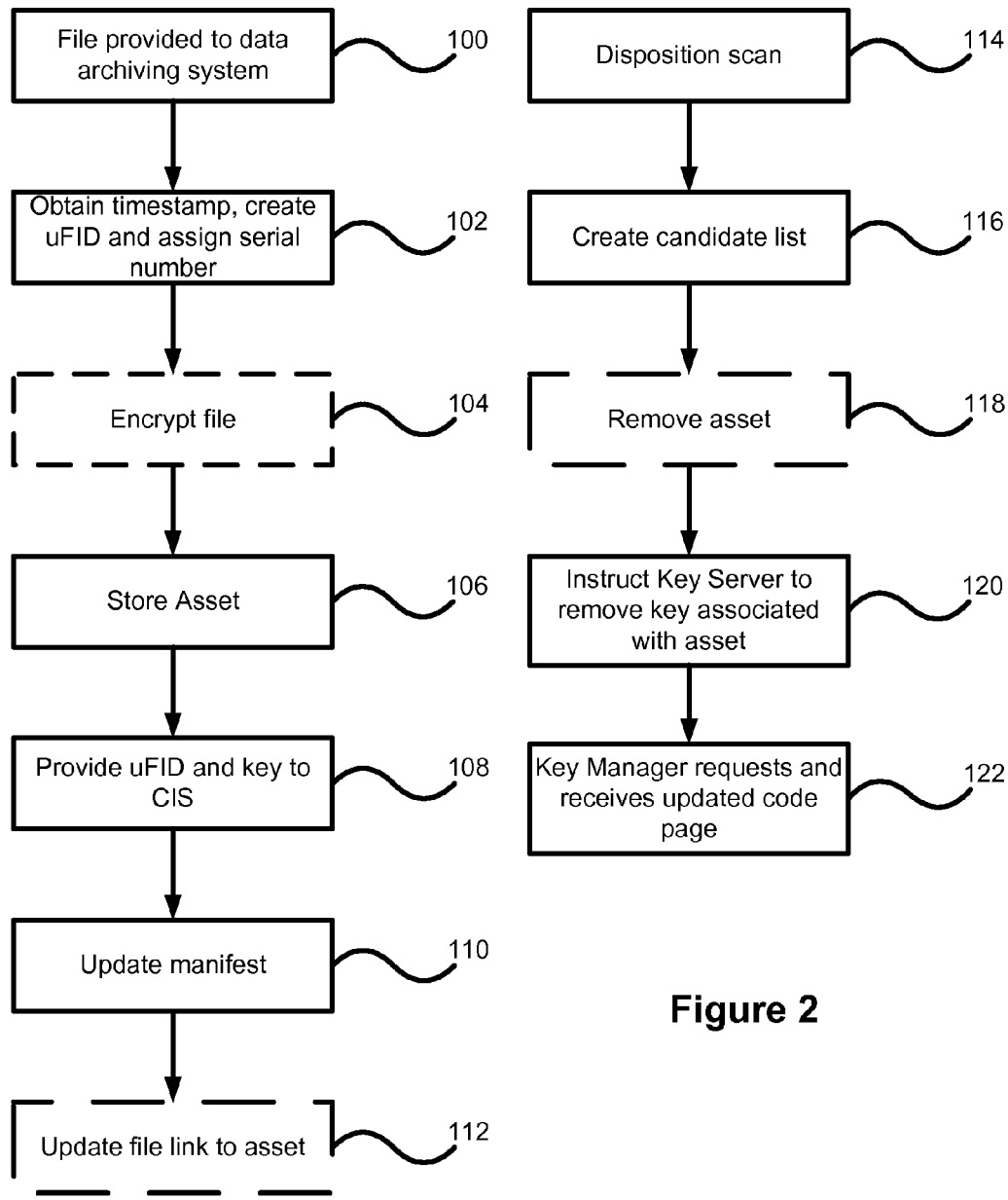

DATA ARCHIVING SYSTEM

CROSS REFERENCE TO RELATED APPLICATIONS

This application is a continuation of U.S. application Ser. No. 11/463,461, filed Aug. 9, 2006, which claims the benefit of U.S. Provisional Patent Application No. 60/706,425 filed Aug. 9, 2005, the contents of which are incorporated herein by reference in their entirety.

FIELD OF THE INVENTION

The present invention relates generally to file storage and management. More particularly, the present invention relates to storage of files in a secure file system to provide accurate date registration of files, content authentication, and immutability. Encryption of the files can also be implemented to provide security and to allow encryption based deletion of files.

BACKGROUND OF THE INVENTION

Many corporate and government entities collect data, and are governed by regulations dictating how the data is to be stored and retained. Different types of data are subject to different types of regulations. Data must often be secured against manipulation, so that it is difficult or impossible for changes to be made to the data without the creation of an audit trail.

Numerous financial reporting regulations require that certain types of data must be maintained for a fixed time period for examination be regulatory bodies. Other data, such as customer financial data or medical records, must be secured against accidental release, and must only be maintained for a defined time period. This can create difficulties for entities that must maintain one set of data for a first time period, and another set of data that cannot be stored for longer than a shorter time period.

In most corporate environments, data is stored on a centralized file system. Safeguards, such as access rights, can be implemented to allow segregated or tiered access to the various types of data on the server. For data security, the central file repository is typically backed-up to provide recovery ability in the event of catastrophic data loss. Backing-up the data typically results in all data being stored on a single backup media element such as a tape. This backup must them be stored for two competing storage times. Some of the data must be preserved, while other data should not be.

Furthermore, if court proceedings or an audit are ongoing, destruction of the backup to allow the required deletion is not permitted. This may result in a requirement for indefinite retention of documents associated with a particular case. It is exceedingly difficult to search through every storage device and piece of backup media to find the data of interest, and of course, for the duration of the order all such media must be preserved. Failure to comply completely has resulted in the most extreme sanctions, and in some cases may lead to criminal prosecution. On the other hand, any given piece of backup media may have information on it relating to thousands or millions of cases unrelated to the court order, the indefinite preservation of which leads to said unrelated data not being destroyed when it is prudent or legally necessary to do so.

The problem is compounded by the fact that it is usually necessary to "restore" a backup tape (i.e. copy it back to hard disk) to be able to search through its content for information of interest. In addition to being labor-intensive and time consuming, it typically requires a duplicate set of hardware upon which to perform the restore operation as the system that created the data is likely to be fully utilized in the day-to-day running of the business. Many times the deadlines for producing documents are on the order of 48 hours, which is typically insufficient to load and search every backup tape in a typical enterprise.

The conventional data center paradigm consists of servers, external primary storage (typically connected via a Storage Area Network), and backup tape drives (usually in the form of a "library" which is a robotic assembly holding a few tape drives and dozens or hundreds of tape media cassettes). This is inadequate for compliance with many regulations for a number of reasons.

The system administrator of a storage network has sufficient access rights so that he may covertly add, delete, or modify any business record in such a way that forensic examination is unlikely to reveal this activity. In a large corporation, there may be many individuals with administrator rights, so even if it was known that tampering had taken place, it would be impossible to determine who was responsible (or indeed, that it was a deliberate act at all and not an accident or software malfunction). Furthermore, for the reasons mentioned above it is not practical to accurately enforce document retention periods as there is no way to "surgically" delete a given record from a piece of backup media.

Conventional data centers do not encrypt the data on the primary storage devices nor the backup media, making them vulnerable to hackers or the loss or physical theft of backup media as it is in transit to the storage facility.

Attempts have been made to address these shortcomings in the conventional data center. One commonly used approach is to store business records on so-called "WORM" (Write Once Read Many) media, which is perceived to be more secure than ordinary computer media. However, the WORM approach has several serious weaknesses. Firstly, WORM media tends to be slow and unreliable. Second, in order to have a given document retention period, it is necessary to group documents together with similar expiry dates on a given piece of WORM media so that it can be destroyed as a unit on the appropriate date (e.g. by shredding or burning). The segmentation of data prior to backup is difficult to achieve in practice. Unfortunately, if a court or regulatory order is found to apply to a single file on the WORM media (which may be many gigabytes in size and hold millions of files), the entire WORM media must be preserved even if it is desirable or necessary to destroy the remaining files. Furthermore, the perceived tamper-resistance of WORM media is largely an illusion as it is a simple technical exercise to copy the contents of a WORM media to the perpetrator's computer, modify anything desired on the copy, and re-write the adulterated data back to a fresh piece of WORM media and substitute this new media for the old media. Lastly, since WORM media is typically stored off-line (e.g. in a box in a closet), there is no automated way to audit the data for completeness and stability. When the time comes to present the data to a court or regulator, only then it may be discovered to be unreadable or incomplete.

To address the limitations of WORM media, a new type of storage equipment was developed, specifically designed for the needs of fixed content data. Some variants were subsequently developed which added additional anti-tamper technologies, said variants commonly referred to as "compliant storage" devices.

A typical "compliant storage" device is the Centera™, manufactured by EMC Corporation. Although it addresses some limitations of conventional storage devices, such as providing assurance that data was not inadvertently modified or deliberately tampered with, it does not address all the issues. Data is not encrypted while inside the unit, thus it would be insecure to allow the data to be backed up to tape or optical media. Furthermore, the architecture requires integration with the proprietary Centera Application Programming Interface (API) which does not include an industry-standard access mechanism for reading or writing data. Lastly, it does not provide any mechanism by which a neutral third party can attest to the completeness or the records under management nor the times and dates said records were created.

Another limitation of prior art "compliant storage" devices is they lack any features, which allow the automated gathering of assets from mobile computing devices (e.g. laptop computers), or remote branch offices. A further limitation of these devices is that the provide no mechanism for deletion of files on offline media such as optical platters or tape.

It is, therefore, desirable to provide a file storage solution that provides encrypted storage with the ability to erase expired information but without providing an opportunity to modify data or the contents of the system without leaving a secure audit trail.

SUMMARY OF THE INVENTION

It is an object of the present invention to obviate or mitigate at least one disadvantage of previous encrypted file storage and archiving solutions.

In a first aspect there is provided a computer-implemented method of archiving data files. The method comprises serializing the files by assigning an associative serial number to each file; storing each file and its associative serial number to a first storage; and verifying the presence of each stored file serially using the stored associative serial numbers and reporting an error if a file is missing. Serializing the files by assigning the associative serial number to each file can further comprise attaching a server identification field to the associative serial number to indicate the server that issued the associative serial number.

According to embodiments, the method can further comprise receiving the files from a client, and/or creating an associative cryptographic hash of each file; storing the associative cryptographic hash of each file to the first storage; re-computing the associative cryptographic hash of a given file; and verifying the authenticity of the given file by comparing its respective stored associative cryptographic hash to the re-computed cryptographic hash. The method can also further comprise reporting an error when the comparison indicates a mismatch. The method can also further comprise providing the associative serial number for retrieval of a corresponding stored file, such as by means of a HTTP symbolic link; and retrieving the corresponding stored file.

According to further embodiments, the method can further comprise periodically replicating the first storage to a second storage. If an error is reported indicating a file is missing from the first storage, the presence of the missing file can be verified in the second storage. If an error is reported indicating a mismatch in the first storage, the authenticity of the mismatched file can be verified in the second storage.

In a second aspect, there is provided a computer-implemented method of storing data files. The method comprises receiving data files for storage; serializing the files by assigning an associative serial number to each file; creating an associative cryptographic hash of each file; generating a first list of the serialized associative cryptographic hashes of the received files; closing the first list after a predetermined time interval; determining an associative cryptographic hash of the closed first list; storing the closed list in a first storage; and iteratively generating, closing, and storing subsequent lists of serialized associative cryptographic hashes of received files, wherein the first element of each subsequent list is the associative cryptographic hash of the last closed list. The lists can be closed after a predetermined number of associative cryptographic hashes have been recorded.

The closed lists can be periodically stored in a second storage for verification, and the method can further comprise re-computing the associative cryptographic hash of a list stored in the second storage; verifying the authenticity of the list in the second storage, by comparing the recorded associative cryptographic hash of the list in a subsequent list to the re-computed associative cryptographic hash of the list; and reporting an error when the comparison indicates a mismatch.

The method can further comprise re-computing the associative cryptographic hash of a list; verifying the authenticity of a list by comparing the recorded associative cryptographic hash of the list in a subsequent list to the re-computed cryptographic hash of the list; and reporting an error when the comparison indicates a mismatch.

The method can further comprise encrypting at least one of the files received for storage with an encryption key; and recording a record of the serial number of the encryption key used and the associated cryptographic hash of the at least one file in a key manager. And additionally, generating unique encryption keys in a key server; obtaining the unique encryption key from the key server for encrypting the at least one of the files received for storage; and recording the record of the serial number of the encryption key used and the associated cryptographic hash of the at least one file in the key server.

The method can also comprise assigning a minimum retention date and expiry date for each file received for storage; generating a list of stored files ready for deletion according to the minimum retention date and expiry date; and deleting the stored files and their associative parts in the list upon approval.

According to another aspect, there is provided a computer-implemented method of archiving data, comprising: receiving data files for storage from a client node; encrypting each file received for storage with a unique encryption key; generating a list of one or more files for deletion; and deleting the one or more files in the list by deleting their respective unique encryption keys. The method can comprise generating and storing a database of unique encryption keys in one or more key containers; and encrypting the one or more key containers with a master key.

The method can further comprise creating an associative cryptographic hash of each file received; creating an associative cryptographic hash of each encrypted file; storing each encrypted file and its associative cryptographic hash to a first storage; re-computing the associative cryptographic hash of a given encrypted file; verifying the authenticity of the given encrypted file by comparing its stored associative cryptographic hash to its re-computed cryptographic hash; and reporting an error when the comparison indicates a mismatch.

Similarly, the method can comprise creating an associative cryptographic hash of each file received; storing the associative cryptographic hash of each file received; creating an associative cryptographic hash for each file on the client site; comparing each associative cryptographic hash of each file on the client site to the list of one or more files for deletion; and notifying a client of the existence of uncontrolled copies of one or more files marked for deletion.

The method can also comprise retiring a master key after a predetermined period of time. Retiring the master key includes obtaining a new master key; decrypting the one or more key containers with the master key; encrypting the one or more key containers with the new master key; and locking away the master key.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 1 is a flow chart illustrating a method of storing an asset;

FIG. 2 is a flow chart illustrating a method of encryption key scrubbing an asset.

DETAILED DESCRIPTION

Figure 3:
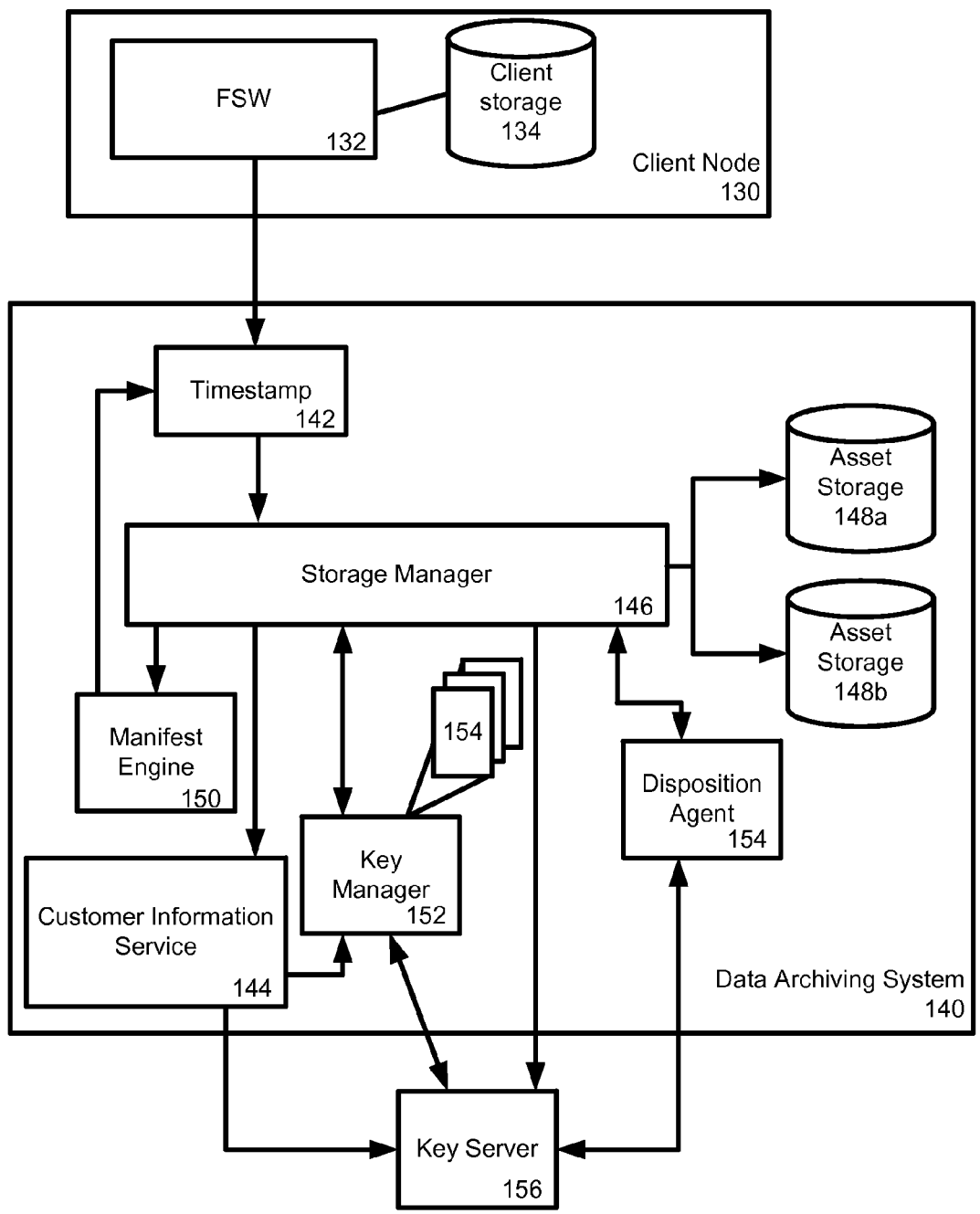
FIG. 3 is a block diagram illustrating a data archiving system of the present invention.

Generally, the present invention provides a method and system for long term archiving of files as digital assets.

Elements of the system described below can be implemented in a modular fashion without departing from the present invention. Thus features can be added and removed fro the system without necessarily departing from the intended scope of the present invention.

The system of the present invention provides the ability to have storage profiles based on any number of criteria including the user that creates the file, a directory that the file is placed into, and other criteria that will be apparent to those skilled in the art.

To allow data security to be addressed, the present invention makes use of data encryption on a unique key per file basis. When a file enters the data archiving system of the present invention, it is encrypted and stored as an asset. A unique file identifier (uFID) is calculated from the contents of the asset, and is maintained in a database. The uFID is preferably determined in accordance with the contents of the file so that it is unique for a given file. A serial number is also assigned to the asset. The metadata can include a creation date, and other information that can be used to determine the retention length of the file. In one embodiment of the present invention, the uFID, the serial number and other information associated with the asset is stored a list-formatted file called a "manifest".

The serialization of assets in a manifest allows an audit at a later date to ensure that the data record is complete. The manifest itself can be stored in the file system as a file that will be converted into an asset. Thus, listed in each manifest is the previous manifest. The removal of a serialized entry in a manifest will be noticeable by the gap in the numbering, while the task of renumbering all subsequent entries is made difficult by the incorporation of each manifest into the subsequent manifest. Tampering with a manifest can be made more difficult if the uFID contains information about the asset, such as a cryptographic hash of the file contents along with a file size. When this is implemented, tampering with manifests becomes computationally complex in addition to time consuming.

By using different encryption keys for each file, files can be individually removed from the data archiving system by purging the database entry storing the decryption key. So long as sufficiently secure encryption methods were used, recovery of the data in the encrypted asset will be effectively impossible. Thus, the encrypted assets can be safely backed up to offline media such as tape or optical. The presence of assets with different expiry dates does not cause difficulty, as the deletion of an asset can be effectively achieved by deletion of the key required to decrypt the asset. This technique is referred to as cryptographic key scrubbing.

Details of the implementation of the system of the present invention are provided below for exemplary purposes, and the following discussion should not be considered to be limiting in scope. Although reference is made to the use of a plurality of computer systems, this is simply a presently preferred embodiment that can make use of redundant elements to prevent unexpected failure. The system of the present invention could be implemented on a single system without departing from intended scope of protection. Furthermore, elements such as the master Key Server which are indicated as being independent operators could be integrated with the data archiving system of the present invention. They are illustrated as distinct entities in the following discussion and figures to provide an additional level of data security and to provide a further safeguard against operator tampering.

In one embodiment of the present invention, the data archiving system of the present invention is implemented making use of a plurality of interconnected computer systems, or "nodes". The use of a plurality of computer systems allows for redundancy and division of functionality to prevent a single point of failure. On each of the interconnected computer systems, various software modules are installed. Data is preferably stored on file storage systems that offer a degree of redundancy such as Redundant Arrays of Independent Drives (RAID) arrays.

In a presently preferred embodiment, two front end nodes are connected to two back end nodes allowing for workload distribution between the front and back end nodes, and to provide active redundancy. The back end nodes preferably make use of RAID arrays for their data storage needs.

On client computer systems that connect to the data archiving system, a File System Watcher (FSW) module is executed to watch for data that should be stored in the data archiving system. When a file is saved that conforms to the requirements for being stored in the data archival system, the FSW connects to the data archiving system and transfers the file.

Connected to the data archiving system is a Key Server, which is preferably backed up by a redundant Key Server. These Key Servers can be located in a geographically remote location to remove the ability to tamper with the Key Servers. It may be advantageous for the Key Servers to be hosted by a trusted third party (TTP). For highest performance, hardware-based cryptographic accelerator chips or cards may be installed in some or all of the nodes of the data archiving system where encryption and decryption are required.

As discussed above, the workload can be divided between "front end" and "back end" nodes, with redundancy provided at both the front and back ends. The front end nodes typically interact with the user while the back end nodes are isolated from the user. This design allows for the operation of the back end nodes to be changed without impacting upon the user. With the FSW installed on user computers, the front end nodes operate as an interface between FSW and the data archiving system. This allows the back end nodes to manage the encryption, storage, manifesting, and metadata database management. Communication between nodes in the data archiving system can be effected through the use of conventional computer networking technology such as Ethernet, token ring and other similar networking technologies. Connection of the back end nodes to data storage devices can similarly be made using standard storage connection technologies such as Fiber Channel.

The FSW can be implemented on a number of different computing platforms including Microsoft Windows, Linux, Apple's OS X, Sun's Solaris and other common platforms including BSD Unix. Upon receiving a connection from an FSW instance from a connected computer, the front end node can provide a number of services including authorization of the FSW client, a timestamping service, an administrative service, a configuration service and a service manager application. Files received for storage as assets are preferably associated with a timestamp provided by the front end node so that the clock of the computer creating the file does not have to be trusted. This timestamping can include associating the timestamp with an XML file descriptor associated with the file. The timestamp can also be cryptographically signed by the timestamping service to provide authentication of the timestamp. Timestamping is a common service whose implementation will be well understood by those skilled in the art. A user connecting to the data archiving system may require access to an administrative panel so that settings can be reviewed by an authorized individual. The front end nodes can provide an interface for such modification to settings, including through the provision of a web-based configuration tool or through the ability to accept messages passed from a standalone application on a user node. A global configuration can also be provided so that a list of trusted clients, servers and users can be maintained and viewed by administrators. A services manager can also be implemented to monitor transactions between nodes or modules. If a requested transaction is not completed within a timeout period, the services manager can re-issue the transaction request.

The back end nodes can be implemented so that services provided by the back end nodes include a Customer Information Service, a storage service, a Key Manager service, a manifest service, a disposition service, an audit service, an Object File Service (OFS) service, and a services manager. The Customer Information Service can be used to manage the database used to track assets as they are stored. This provides a single entity for serializing assets and caching and storing the metadata associated with the serialized assets. The storage service provides an interface to the physical storage devices. This provides a defined interface for the rest of the system to interact with the storage device through, allowing a change in the design of the storage devices to be transparent to the rest of the system. The storage service can also handle managing redundant storage of the data on a pair of connected RAID subsystems. The Key Manager service handles and assigns the keys used to encrypt individual assets. If keys are generated by an external entity the Key Manager service is typically responsible for requesting new keys when the locally cached set is sufficiently depleted. The manifest service assembles a manifest of the assets placed into storage. In one embodiment, manifests are created at fixed intervals, after a predetermined number of assets are stored, or a combination of both factors. The manifest is typically a file, such as an XML formatted message, that tracks the serialized assets. When a manifest is completed, it can be digitally signed using the Time Stamping service to ensure that it is not tampered with, and it can be stored as an asset. By storing a manifest as an asset, the manifest becomes the first item recorded in the next manifest. When a series of manifests are examined, each manifest, save for the first, will have the previous manifest as the first entry, along with the uFID associated with the previous manifest. A manifest cannot easily be tampered with, as that would change the uFID, which is recorded in the next manifest. Thus, modifying a manifest would require modifying all the subsequent manifests, which would be difficult to do without leaving a trail due to the use of a secure time stamping process. Manifests can also be provided to the Key Server allowing a comparison of the stored manifest with a known good copy. Thus, if an individual wished to modify an asset, the change would be noticeable due to the fact that the asset is recorded in an manifest, and the manifest cannot be modified without creating a trail. If an asset is removed, the serialization of assets will reveal the removal, as a gap in the serial number sequence will be noticeable. Thus, information such as the uFID associated with the manifest, and other file related information to be stored in a carry forward manner. This carry forward manner (also described as a Russian-doll storage method) encapsulates one manifest as an item in a subsequent manifest. An audit process can easily be implemented that checks the validity of an asset by recomputing its uFID, verifying the recomputed uFID with the uFID stored in the manifest and then checking the uFID of the manifest. Manifests can be checked, starting with the most recent manifest, by examining the uFID of the previous manifest, and computing the uFID of the corresponding manifest. The check can then be repeated recursively to ensure that the manifest chain is untampered.

A disposition service is used to check the expiry date of assets committed to storage. A list of assets ready for deletion according to the expiry date set in the metadata associated with the asset, can be created and used in the encryption key scrubbing process. The list of files for deletion can be provided to the Key Manager, possibly after operator approval, so that the encryption keys associated with the assets can be deleted. The asset can also be removed from live storage. Even if the asset is available on a backup, the removal of the encryption key from the Key Manager and Key Server will ensure that it is not recoverable. The audit service scans the stored assets and can compare them to information in the associated metadata to ensure that files have not been tampered with. The metadata can store information such as a cryptographic hash of the asset, allowing for simple checking to determine if the asset has been modified. Stored manifests can also be checked for improper file changes. The OFS service can be used to perform housekeeping tasks such as clearing unused temporary files, removing unneeded transaction monitoring logs and managing online caches of assets. The services manager, as with the front end nodes, tracks the interaction of the services both internal to the back end node and with external nodes, ensuring that unfulfilled transactions are re-issued after a timeout period.

As noted with reference to the back end system, encryption keys can be generated by an external Key Server that can be hosted by a TTP. This allows the keys to be generated en masse, and prepared as key pages that can be requested by the Key Manager. The keys are preferably designed for single use as symmetric encryption keys, although they can be generated as asymmetrical key pairs as well. It may be preferable for redundancy for multiple Key Servers to be available to the data archiving system such that at least two Key Servers are geographically far apart from each other to provide a greater likelihood of redundancy. The Key Servers may also be connected to a time server device, such as a Stratum 1 time server device, that provides accurate and tamper resistant time and date values which may be stored with received manifests as an additional verification of their timestamps. It can be appreciated that the benefit of generating encryption keys remotely is that it ensures that keys are safely replicated in a remote location prior to being used to encrypt files.

In a presently preferred embodiment, each of the services is designed with an abstracted message-passing interface to other services. This includes the ability to have a list of instances of any given service. Running multiple instances of the same service allows operation to continue if a particular instance of a service becomes unavailable. Furthermore, it becomes possible to implement any arbitrary number of instances of services to scale performance with the number of nodes served by a cluster of systems providing the storage system of the present invention. One mode of operation uses a round-robin selection of services so that approximate load balancing is achieved. Because the interface is abstracted, services can communicate with one another on the same piece of server hardware, between clustered servers connected on a LAN, or even between nodes separated by thousands of miles and connected across a WAN or the Internet. The ability to spread services across an arbitrary number of nodes allows for easy cost/performance tradeoffs as the number of nodes and the number of services per node is varied.

In the operation of one embodiment of the present invention, the Key Server reads a monthly Master Key from a CD-ROM and then decrypts and checks the integrity of its database of keys during an initialization process. This database is generally on a local disk drive directly connected to the server. The Key Server is best placed in a remote site, and normally there will be at least two of them hosted by a neutral and trustworthy third party.

At the customer site, when the Key Manager boots up, it also loads a Master Key from a CD-ROM and performs various integrity checks, and sends a request to the Key Server to see if any of its Code Pages need to be updated. A Code Page is an encrypted container (the key to which is stored in a table which in turn is encrypted by the Master Key), which holds a large number of individual records, each record having a key, a serial number, and other housekeeping information. Code pages can be arbitrarily large or small, although in one embodiment, they hold 5,000 individual key records. If any keys have expired, the Key Server sends the updated Code Pages to the Key Manager with the expired keys deleted. The Key Manager overwrites old Code Pages with any revised Code Pages that the Key Server has supplied.

Since keys are needed quickly and in large quantities, the Key Manager can request a number of Code Pages, and then cache the Code Pages locally. An internal hard drive can be used for storing Code Pages. If the number of cached keys falls below a threshold, the Key Manager requests another set of Code Pages from the Key Server. This can be an asynchronous process disconnected from the process that encrypts user data. At any given time there can be many tens of thousands of individual key records sitting in the Key Manager waiting to be used.

The File System Watcher (FSW) client monitors the user's computer looking for new files that meet a set of configurable criteria. When a file meets the criteria it is treated as an indication that the file must be sent to the data archiving system for long term storage. The criteria may be simply that the file is put in a given directory, the file has a certain file type extension, or other criteria desired by the administrator.

When FSW detects these files, it sends them to the web service on a front end node. The web service sends an XML fragment containing the information sent by FSW to the Customer Information Server, which in turn requests a time stamp from the XML Time Stamp service, which provides a digitally signed time and date, which is then combined with other metadata and sent to the Storage Manager by the web service. The Storage Manager uses the unique file identifier (uFID) associated with the file as a CAS address for storing the file. Whereas prior art data management utilities have attempted to create unique file identifiers using a cryptographic hash, the present invention provides a mechanism to reduce hash collisions. When a file is hashed, it is subjected to a many-to-one mapping. The output of the hash is typically shorter than the file, and thus cannot be considered to be unique across all file sizes. However, it is often considered that a hash, such as the MD5 or SHA-1 hash in concert with a file size provides a sufficiently unique identifier. In the present invention, a unique file identifier is preferably created by a combination of known hashes. This combination of hashes decreases the likelihood of a hash collision. Hash collisions occur when two distinct files having the same file size map to the same hash value. Although it is likely for a sufficiently large set of files that there will be MD5 or SHA-1 collisions, the combination of hashed values exponentially decreases the likelihood of collisions. Due to the different manner in which each algorithm creates a hash, the likelihood that a hash collision will results for both MD5 and SHA-1 on a pair of files is very low. The combination of hashes can be as simple as the concatenation of the hash values. This concatenation can be made more unique by incorporating a file size as well.

Preferably, the Storage Manager also issues a globally unique serial number per file. This serial number can be made up of a customer number (issued by the vendor), an installation number (e.g. 0001 for the first cluster purchased by the customer, 0002 for the second and so on), a user-defined department number (which is part of the FSW configuration), and a sequential serial number issued by the storage manager. Other information can be encoded into the serial number in place of these elements as desired by the system administrator.

By creating a uFID comprised of the concatenation of the MD5 and SHA-1 hashes of the file contents and the file size, the probability of hash collisions is reduced to a statistically insignificant likelihood. The problems that would be associated with one of the hashing algorithms being cryptographically broken are also greatly diminished as the probability of both hashing algorithms being compromised in the same manner are very unlikely. By associating the sequential serial number assigned to an asset and the uFID of each asset, a trail is created to allow for an effective audit process by examining the manifests to ensure that each serial number is accounted for and to ensure that a file in the manifest matches its uFID. If an entry in the manifest is removed, it will be obvious by the gap in the sequence, and systematically renumbering all entries in the copies of the manifests and properly re-encrypting each file to obtain new assets is sufficiently difficult that it will not be possible without causing a trail. This is further complicated by the fact that a manifest is listed as an asset in the next manifest along with its uFID, which includes a hash of the manifest data. As noted above, the likelihood of being able to modify a manifest and maintain the hash value is statistically insignificant. A secure access log tracking access to each of the assets can also be implemented to provide a level of security by indicating who has accessed each asset and when the asset was accessed. This, along with the other security features provides a sufficiently robust trail to allow for a simplified audit process. One skilled in the art will appreciate that if two users attempt to save the same file to the storage system, the system will assign two serial numbers (in response to the two storage requests), but because assets can be indexed by their uFID, only one instance of the file need be saved. The use of the uFID as a storage index allows for a form of content addressable storage (CAS) that can be used to avoid storing duplicates of a given file.

When a FSW determines that a file is ready for entry into the Data Archiving System (DAS), three actions can be taken: the file can remain in place while a copy is sent to the DAS; the file can be replaced with a shortcut pointing at a copy in the DAS; and the file can be deleted from the directory, requiring that the user next access the file by using the DAS. The desired retention time for a file can be relayed by the FSW, as it allows for user control and modification without requiring system reconfiguration. In an alternate system, the FSW can forward information relating to the retention time to the data archiving system, allowing the system to make centralized decisions based on the forwarded information. Retention time can be determined by an implicit rule configured for a particular directory, it can be specified by a "last modified date", and it can be related to a customer profile. The use of a "last modified date" is a convenient way for application software to configure the retention date on the fly. For customer profile based retention periods, an application-defined "record locator", such as a customer number, can be prepended to the file name. Deletion of files can occur a programmable number of years after a given record number is provided in a list sent by the customer to the disposition manager. This mode is useful to comply with regulations which say that records must be kept a certain number of years after the customer account is closed. Thus, the FSW can provide retention information, for example as an XML fragment, to the data archiving system.

A Web Service then receives the information from the FSW (possibly including a uFID). This information is sent to the CIS which then assigns a serial number to the file. The file will be stored using the uFID as an identifier allowing for content addressable storage, but will allow retrieval based on the serial number as well, so that users storing the same file do not need to be aware of the multiple instances of the file. The CIS can review the retention policy to determine if the file should be encrypted or compressed prior to storage. The CIS then sends the file and associated information to be time stamped. The Time Stamp service can sign the XML fragment and convert it to a proper XML document. This document is then provided to the storage manager. The Storage Manager encrypts and compresses the file using the next available unused encryption key obtained from the Key Manager if required. Upon encrypting the file, the Storage Manager sends a record of the serial number of the encryption key used plus the uFID of the file to the Key Manager, which in turn notifies the Customer Information Service so the record can be stored. Preferably the information is stored in at least two databases. A redundant copy can also be dispatched to the remote Key Servers so they can mark the key as being used. This can also allow the Key Server to keep a record of the encryption key associated with a given uFID.

A record is constructed containing the encrypted file, its uFID, its serial number, the time and date of creation, the desired retention policy, plus configurable customer-supplied metadata. This then becomes an "asset". One skilled in the art will appreciate that when files have been migrated to the encrypted file system they become assets. Applicant has endeavored to appropriately differentiate between files and assets through the document.

The Storage Manager can keep its own cache of Code Pages. When the storage manager needs more encryption keys, it requests the code pages from the Key Manager. The next available key and its serial number are taken from the Code Page cache, and used to encrypt the file, at which time the file is turned into an asset for storage. This asset can then be stored. In a redundant system, the asset can be stored on at least two back-end devices, typically external RAID arrays or optical jukeboxes. A manifest entry is created for the asset which includes the uFID, the time stamp, the serial number, the metadata, the serial number of they key used to encrypt it, and other housekeeping information. This manifest entry is stored in a manifest by the Manifest Server, which builds manifests as assets are being sent to the storage solution of the present invention. At fixed intervals, such as every five minutes, the manifest holding the manifest entries generated during the interval is sent to the Key Manager that in turn "registers" the Manifest with the Key Server located at the remote site. The manifest is then provided to the Storage Manager to be stored as an asset, and forms the first entry in the next manifest.

In one embodiment, the manifest is an XML file which lists the above listed metadata items for every file that has come into the file storage system in the last 5 minutes, or up to a defined maximum number of file listings per manifest file. When one manifest is closed off, another new one is started. When manifests are closed, they are stored back into the device just like other user files (which provides the security/integrity features described above) and also is transmitted to the Key Server which is a remote device.

As each file is converted to an asset for storage, it is preferably encrypted, with its own key so as to permit encryption key scrubbing (encryption based file deletion) on a file-by-file basis. As a file is encrypted and the corresponding asset is added to the system, the uFID of the asset is added to a manifest that tracks the encryption key, a location of the encryption key or a serial number associated with the encryption key. In one embodiment, a manifest is created at either fixed intervals, after a predetermined number of assets have been added, or some combination of the two. The file manifest is a data structure which contains the list of key containers which have been consumed, the names assigned serial number and uFID (plus other metadata such as time at which the file was sent to the storage system) of files added since the last manifest, and other housekeeping data. The manifest is eventually stored in the file system as another file. By providing each file with its own key, as opposed to the prior art use of a single key for all files, or at most a small number of keys, individual assets can be effectively removed from the system without impacting other assets.

When a manifest is closed it can be sent to the remote Key Server, which can then digitally sign the manifest, and store it into a central repository. Because the remote Key Server is hosted by a TTP, which may provide similar services to a number of different customers, it may be preferable for the remote Key Server to make use of a storage system similar to the data archiving system to provide data security and integrity. The Key Server can then send the signed manifest back to its file storage system as an asset for storage. By storing the manifest in the data archiving system file system, it ensures that the signed manifest becomes part of the next file manifest. A copy of the manifest can be deposited with a title attorney or in another non-digital venue that provides time and date attribution. The manifest makes reference to the consumption of encryption key containers. This information can be recorded by the remote Key Server so that a record of who has used particular key containers and when the key containers can or should be deleted can be maintained by the remote Key Server.

Reference is made to the deposition of a manifest with a non-digital venue. In addition to providing the time at which a TTP has signed the manifest, the manifest itself can be provided to a non-digital entity. Because of the nested nature of manifests (with each manifest having its uFID and metadata stored in a subsequent manifest), a series of non-contiguous manifests can be provided to a title attorney, who can provide attestation to the date at which the manifest is received. If two manifests are received by a title attorney, and the manifest containing the metadata for a required file is stored on an interim manifest, it can easily be established that the interim manifest was opened and closed between the two attested dates. To prove this, all the manifests between the dates can be examined to show the linkage between the manifests. Because a manifest is entered onto the next manifest as an asset, it has a direct effect on the cryptographic hash of the next manifest. This creates the "feed forward" nature referred to earlier, which can also be thought of as a "Russian Doll" storage, where each manifest can be opened to verify the authenticity of the previous manifest.

The file manifest handling disclosed above has numerous advantages. Providing manifests to a TTP allows the TTP to attest to time and date of file creation. Providing the manifests to a non-digital authority, in conjunction with the nested nature of the manifests, allows the non-digital authority to provide a book ended time frame during which a file was provided to the storage system. A third party can also attest to the completeness of the records based on the use of serial numbers and nested manifests. During the process of attesting to the completeness of the records, no confidential information needs to be transmitted to third party as the manner in which the manifests are designed and stored provides sufficient information to base the attestation on. Third party time/date stamps can be compared to customer time/date to indicate that the storage system is not modifying its internal clock in an attempt to circumvent procedures. A manifest cannot be undetectably modified without invalidating subsequent manifests as "correcting" subsequent manifests would require information which is not available at the customer site and in any case would not match the copies kept at the Key Server. It is only necessary to examine the most recent manifest to have confidence that the manifest chain has not been tampered with. Because the Key Server correlates assets with the key container used to encrypt them, the key database stored in the Key Server can be used in emergency situations to decrypt any given asset.

When the Manifest Server stores the Manifest Container back on the cluster as if it was a user's data asset, it is given a digitally signed timestamp, a uFID, a serial number, an encryption key, and is stored on the back-end storage. This means that one of the elements of each manifest is the metadata of the most recent previous manifest. The previous manifest is typically the first entry in the subsequent manifest. The previous manifest in turn includes the metadata from the manifest before that and so on.

When a document's retention period has expired, it will be handled by the Disposition Manager. The Disposition manager can be run as a scheduled process, such as a nightly process that checks the integrity of Manifests by confirming their contents with the Key Server and by checking internal consistency. The Disposition Manager then reports back to the Key Server with a list of the keys that should be deleted to allow for document expiry. Subsequently, when the Key Manager next does an update of its key pages, the Key Server will provide new Code Pages with the keys associated with the expired documents received. Thus, the Key Manager will lose the ability to decrypt the expired asset.

Since the local cache of Code Pages on the Key Manager is preferably super enciphered with the Master Key, the administrator is free to use any convenient backup software package to backup the Key Manager server, including the Code Pages stored on the local drive. Every month, the Master Key, typically distributed on a CD-ROM, can be changed and the old code retired. If the administrator does not destroy or otherwise dispose of the Master Key, the old Code Pages can be restored from a backup and then decrypted, thus encryption key scrubbing cannot be considered to have taken effect until the Master Key, or the media on which it is delivered, is destroyed. This can provide a safeguard, and allows for a safety net that permits a site to destroy Master Keys once they are considered to be safely past the deletion period. By destroying a key, the file remains in the system, but is effectively inaccessible. By selecting a sufficiently rigorous encryption routine such as the 256 bit Advanced Encryption Standard (AES-256), the data can be considered to be irretrievable when the key has been destroyed.

An example of configuring FSW, creating an asset, reading it back, and deleting it is instructive at this point. It should be noted that the following example is provided for the purposes of teaching one embodiment of the invention thoroughly, and should not be considered as limiting of the scope of the present invention. In no way should this example be considered as a sole embodiment, or as restrictive to the scope of the present invention. For this example, it is assumed that the Key Manager has sufficient code pages in its cache. This example is provided in concert with FIG. 1 which illustrates the steps outlined below.

The human administrator accesses the SysAdmin configuration console using a web browser, and selects the link for "FSW Configuration". The console lists all instances of FSW that exist in the network. The administrator selects "HumanResourcesServer" from this list, and configures it to watch the directory called "PersonnelFiles", with a 5 year retention rule set, encryption turned on, and set to replace files with shortcuts.

The instance of FSW on HumanResourcesServer periodically queries the SysAdmin service to see if its configuration has changed. It sees the updated configuration file and loads it. FSW starts to monitor the PersonnelFiles directory for changes. A user of the HumanResourcesServer then stores a document called HomeAddresses.doc into the PersonnelFiles directory.

FSW is notified by the operating system that the directory contents have changed. The FSW queries the date, time, and size of the file. FSW puts the file information in the queue of files to be dealt with. When the queue has reached a size which is efficient for network communication, or when a certain amount of time has elapsed since the first entry in the queue was stored, the contents of the queue are sent to the front end node in the FSW configuration table. If for some reason this transmission fails, attempts are made to send the queued files to the next front end node, and so on. If no front end node is available, FSW continues to queue files as needed. Once a front end node become available, the files are sent. In this way, FSW supports mobile computing platforms and remote offices which have unreliable or periodic network connections. For this example, however, we will assume that HomeAddresses.doc is the only entry in the queue and that the communication with the first front end module is successful. This results in the transfer of the file to the Data archiving system in step 100.

Upon receipt of the file at the front end node, a request to the time stamp service is issued for a timestamp to be associated with the asset. Note that the time of the timestamp received may vary from the time stamp reported by FSW. Since the date and time set on remote servers and workstations is not considered to be particularly reliable, the date and time assigned by the time stamp service is the one used for calculating disposition. Later it will be seen that there is a step where this time stamp can be corroborated with that on the remote Key Servers.

An asset record consisting of the file name, claimed date and time (user provided), actual date and time (time stamp service provided), file size, retention period rule, and customer-supplied metadata (if any) is created. This record is sent to the first Storage Manager in a configuration list (all services have a list of all other available instances of services so that in the event of any service failing to respond, the operation can be retried on one of the other instances). This record can also contain information regarding the retention policy for this file.

The MD5 hash of HomeAddresses.doc as well as the SHA-1 hash of the file are computed. In place of the SHA-1 hash, other hashes of the SHA family, such as SHA-2 hashes (SHA-224, SHA-256, SHA-384 and SHA-512) can be used. Other cryptographic hash algorithms may be used without departing from the scope of the invention. These two hashes are concatenated along with the size of the file to create the uFID for the file. In a statistical sense it is sufficiently unlikely that two files of the same size will be provided the same uFID, so the concatenation of the hashes is considered to be unique across all files of the same size. Because the MD-5 hash algorithm and the SHA family or algorithms are very distinct, it is unlikely that when an MD-5 collision occurs the same two files will have a SHA collision as well. Similarly, if, for example, someone figures out how to adulterate a file without the MD5 hash changing, it is highly unlikely that both the file size and SHA-1 hash will also be unchanged. However, if two files from two different people have identical content, even if they have different file names and dates of creation, the uFID will be the same for both files as the uFID does not typically concern itself with the creator, creation date and file name of the file in question. Because they have the same uFID, the storage system can store a single copy and provide Content Addressable Storage.

The serial number is also assigned to the storage request. In contrast to the uFID, if two identical files are sent across from FSW, even if they have the same file names and date of creation, a new serial number will be issued. This number is used to keep track of individual storage requests. The uFID can be provided by an external system such as the Customer Information Service. Thus, in step 102, a timestamp is obtained, a uFID is created and a serial number is assigned.

The file name and contents are encrypted with the next available encryption key in step 104. The serial number of the key used and the uFID of the file are forwarded to the Key Manager in step 108. The Key Manager sends the information to the Customer Information Service, which stores the information into a redundant pair of SQL databases running on different nodes. The Customer Information Service also forwards the information to the remote Key Servers. The remote Key Servers mark the keys as used and the information is stored in SQL databases local to the Key Servers. One skilled in the art will appreciate that although the step of encrypting the data provides data security, and eventually permits individual file-by-file encryption key scrubbing, the integrity of a file storage system can be authenticated by audit without use of an encryption system. In some embodiments of the system, when the CIS assigns the serial number, it can also provide an indication of whether or not the file is to be encrypted in the metadata. This indication can also include the encryption key to be used.

The Storage Manager then, in step 106, stores a copy of the encrypted HomeAddresses.doc file, along with its associated metadata on at least two different external RAID storage devices as an asset. The uFID is used as the asset identifier, so this means that only one instance of a given set of file contents will be stored per RAID device. In this way, space is not consumed by multiple copies of identical files (such as when hundreds of identical copies of a document are distributed within an organization). This storage capability is commonly called "Content Addressable Storage" (CAS). Once the asset is safely stored, a completion message is sent to FSW. One skilled in the art will appreciate that the order of certain steps, such as steps 106 and 108 need not be performed in the illustrated or described order. During this operation, a "transaction recovery file" can be created and updated at various steps. This recovery file can provided assistance if steps in the storage process fail and must be retried.

The serial number, the expiry date, the uFID, the key container number, the date and time, and file size are put into a record and added to the currently open manifest in step 110. Every five minutes the manifest is closed and processed, and a new one opened.

FSW removes the file from HumanResourcesServer and replaces it with a symbolic link that points at the Web Service in step 112. The symbolic link also contains the serial number of the asset. FSW can be provided with an indication that the storage of the file as an asset is complete before the file has been stored as an asset so long as the data archiving system has received the file and possesses sufficient information to proceed in the event of a process or hardware failure. In such an example, the transaction recovery file can be used if the FSW has been provided with an indication of successful storage and an error occurs in the storage process.

When a file is received at a front end node, the transaction can be tracked to ensure that the corresponding asset is successfully stored. Upon providing the Storage Manager with the file and corresponding metadata (including instructions pertaining to whether or not the file should be compressed or encrypted) the front end node has completed is portion of the storage process. However, the front end node can leave the transaction record marked as incomplete until the storage manager provides an indication that the asset has been successfully stored. This allows the front end node to monitor the progress of each transaction and re-issue storage requests if required.

To read back the file, the user can open the symbolic link as if it was a local file name. The Web Service sends the asset serial number to the Customer Information Service, which in turn looks up the serial number to find the uFID of the file, which is sent to the Storage Manager. The Storage Manager retrieves the file and returns it to the Web Service, which in turn returns it to HumanResourcesServer.

No mechanism is provided for the customer to delete assets on demand. Deleting the symbolic link does not destroy the asset, nor is the user given direct access to the RAID storage.

However, as illustrated in FIG. 2, the system is designed to allow files to be deleted once the retention period has expired. Every day, the disposition service scans through the assets under management, in step 114. If more than 5 years have gone by since HomeAddresses.doc was created, it will be added to a list of disposition candidates, in step 116. The human administrator is expected to periodically review this list and approve the disposition of the assets. At any time prior to disposition, the administrator may place a "hold" one or more assets, which will prevent their destruction indefinitely. A hold is typically placed on assets which have continuing business value or which are ordered to be retained by a court or regulatory agency.

If no hold is placed, and the administrator has approved the file destruction, the Storage Manager will scrub the file from all RAID systems where it has been stored. This can be accomplished by any number of known techniques including by overwriting the file with 7 different bit patterns. The deletion of the asset, in step 118, is considered optional as it may not be possible in WORM implementations, and as the asset will also be encryption key scrubbed, deletion of the asset is no longer technically necessary. Once a batch of files has been disposed of, a disposition manifest is sent to the remote Key Servers, in step 120, instructing the remote Key Servers to remove the keys associated with the deleted assets. The remote Key Server scrubs all local copies of the encryption key for the file. The local Key Manager, in step 122, at fixed intervals requests updated code pages from the remote Key Server. The updated code pages will no longer contain the removed keys, effectively completing the encryption key scrubbing process. Once all copies of the encryption key are destroyed, any backup copies of HomeAddresses.doc which may have been made from the encrypted repository on the RAID storage will become unreadable. In this way, the document is encryption key scrubbed from any backups, which may have been made of the encrypted repository.

A number of advantages can be realized through various implementations of the present invention as disclosed above. The architecture above-described architecture is believed to comply with all relevant requirements of SEC 17a, HIPAA, CFR 21 part 11 (FDA), Sarbanes Oxley, PIPEDA of Canada, the UK Data Protection Act, and other regulations. Assets can be stored on a plurality of storage devices, each of which can employ redundancy such as RAID technology for further reliability. Stored data is encrypted, reducing the likelihood of accidental data release, and accordingly data on backup media is also encrypted. Expired assets persisting on backup media are effectively irrecoverable. Encryption key management can be fully automated. Encryption keys can be stored in multiple redundant geographically dispersed locations. Assets cannot be accessed without permission, cannot be modified, deleted or inserted into the archival system without detection. File creation time and date values can be externally verified. A neutral third party can attest to the completeness and authenticity of the assets without having any knowledge of the actual contents of the assets. All transactions across the network can be monitored, and if necessary, retried until successful. Data storage capacity requirements can be reduced by CAS technology. Remote and intermittently connected systems can be supported.

In other embodiments, various modifications can be performed without departing from the scope of the present invention. The following list provides a number of modifications that should be considered to fall within the scope of the present invention. The following list of modifications should not be taken as limiting, and it is noted that other modifications that are not listed still fall within the scope of the present invention.

Other interconnection technologies can be employed—for instance, Infiniband can be used for the interconnection between nodes and/or storage, or iSCSI could be used instead of Fibre Channel for communication to the RAID storage.

Other packaging is possible—for instance, a server case with many disk drive bays can be used which also integrates the data storage with the services nodes.

The system can be implemented on any number of operating systems.

FSW could also be programmed to scan the user's computer and make a uFID for each file on it. This list would be compared to the list of assets under management or which were supposed to be deleted after their retention period is up, and notify either the user or the administrator that there are "stray" or uncontrolled copies of documents in existence.

Use of WORM tape or optical in addition to RAID is another possibility, with the tape or optical either being used in a Hierarchical Storage Management (HSM) paradigm for less frequently accessed data, and/or used as a journal to store copies of each new asset as it is received.

Encryption can be turned off on a per-directory basis, so in many cases the technology can be used with no encryption at all.

The Storage Manager node could be entirely contained inside a conventional RAID controller, e.g. with a network addressable storage (NAS) front-end.

The FSW technology could be licensed to be embedded in any of a large number of devices which capture data. For example, police or insurance photographers would take a picture of an item of evidence, and the FSW client would make a digital signature and time stamp of the item and the next time the camera is docked in its cradle, FSW places the assets under management in the cluster. Thus, there is a chain of evidence to prove the authenticity of the photo, and the completeness of the overall photographic record. Some devices which could use the technology include:

Digital Camera
PDA, especially if it has an embedded camera
Video Camcorder
DVD recorder
Audio recorder (e.g. for interrogations)
Traffic enforcement cameras
CATscan, Xray or other medical imaging cameras
Computerized lab equipment (e.g. medical lab gear, breathalyzers, chromatographs)
Video Surveillance recorders
Telephone recording device
Handheld computers used by couriers (e.g. Fed-X, military couriers)

FIG. 3 illustrates a block diagram of a system of the present invention. It will be described here as being interconnected elements in a system, without reference to how the elements may be divided if a distributed data archiving system is implemented. One skilled in the art will appreciate that any number of different implementations can be provided dividing the workload of the different processes in different ways without departing from the scope of the present invention.

Client node 130 generates files for compliant storage. The creation and modification of these files on client storage 134 is monitored by FSW 132. Upon detection of creation of a file for compliant storage, FSW 132 transmits the file to Data Archiving System 140. The file is provided to timestamp engine 142 which stamps the file as described above to ensure accurate tracking of the file arrival time. The timestamped file is then provided to Storage Manager 146 which generates the uFID, attaches a serial number and otherwise prepares the metadata associated with the file. Storage Manager 146 then requests a key from Key Manager 152 which obtains the key from code pages 154 which are locally cached. The file is then encrypted and provided for storage in asset storage 148*a* and 148*b*. Information about the stored asset and the related file is provided to manifest engine 150, which adds a record to a manifest to track submissions to the DAS 140. Storage manager 146 provide file information and identification of the key used to CIS 144, which can be an external element to the system 140. Upon filling a manifest, manifest engine provides a manifest to timestamp engine 142 as a new file for storage in DAS 140. Key Manager 152 obtains code pages 154 from Key Server 156 and can cache them locally.

As discussed above, Disposition Agent 154 monitors files in asset storage 148a and 148b, to determine if they should be disposed of. When disposition agent instructs files to be disposed of, the asset can be removed from asset storage, and Key Server 156 is informed of the disposition request. Key Server 156 can then remove the key associated with the asset from the code pages. The updated code pages are then provided to Key Manager 152 and replace cached pages 154, effectively completing the encryption key scrubbing.

Further operations of the system illustrated in FIG. 3 will now be discussed. Key storage is done by storing a copy of the key to multiple locations, preferably in multiple geographic locations. The Master Key Server 156 can be remote from the Key Manager 152 and is responsible for managing the generation and long-term storage of cryptographic keys. The master Key Server 156 is typically hosted by the system vendor and is in a secure facility, although it can be implemented by a customer as well. The Key Manager 152 preferably has a redundant encrypted key storage designed to withstand 100% loss of data in a single unit. DAS 140 preferably has one or more Key Managers that manage the issuance and rolling of key values. Key Manager 152 stores keys in code pages 154.

The Key Manager 152 determines that the available number of keys is below a low water mark. A new code page 154 is then requested from Key Server 156. Each code page 154 contains key containers that each holds a cryptographic key. The master Key Server 156 generates code pages dynamically. Each code page is preferably stored to three or more redundant storage locations. Code pages can be flagged for nightly backup in all three locations. The backups are preferably retained for two weeks on a rolling basis.

The Key Manager 152 downloads each code page. The code page is encrypted by the Key Server 156 with a 256-bit key and is then stored. The code page key is then encrypted with a local RSA key and is cataloged in the CodePageHeader file, which is encrypted with a key found in the Root Key file. The root file key is preferably stored in removable media or a hardware key token accessible to Key Manager 152. Root file keys are destroyed according to a fixed schedule.

The consumption of keys is now discussed in further detail. As files entered into the system 140, storage manager 146 obtains a key that will be used when encrypting the file. Key containers can be serialized, with two components, the code page serial number and the container serial number. A key container is associated on the first instance of the file. It is attached to the file uFID. Each uFID is associated with all storage requests of the same file when content addressable storage is implemented. Each storage request is accompanied by a signatureID, which is itself a serial number. Each signatureID has a life cycle attached to it, including the expiry date. These data are stored by Customer Information Service 144 and the Storage Manager 146 so that disposition agent 154 can determine when files should be disposed of, and to allow file retrieval.

Every 'n' minutes the manifest engine 150 creates a manifest as discussed above. The storage manifest typically includes a ManifestID, a signature ID (storage request), file uIDs associated with the storage requests, a life cycle expiry date, a time stamp of storage and an encryption code page serial number and key containers. The manifest is then timestamped and provided to Storage Manager 146 for storage as an asset. When the manifest is stored as an asset, its metadata is added to the next manifest. A copy of the manifest is sent to the master Key Server 156 for redundant storage. The manifest information is then associated with the originally generated key containers and code pages. This includes the expiry date of the key container, the uFID and the signatureID. The key container cannot be removed from the system until it has expired, however an expired container is still active until it has been specifically disposed of.

On a daily basis, or on another similar schedule, the customer is provided with a disposition selection manifest report by the disposition agent 154. An on-screen report can be used to show the assets available for disposition. The customer then can approve the assets for disposition. At a predetermined time, the disposition agent 154 goes through a process of validating the approved disposition request. This preferably includes a level 2 check of authenticity and integrity. Once the disposition manifest has been validated, the assets are deleted from the system by sending a deletion request to Storage Manager 146. On conclusion, a disposition manifest is sent to the Master Key Server 156. The server matches up the disposition manifest to the original key container. The key container can then be removed from the active system during the "roll" process.

Nightly, after 'n' minutes following the disposition manifest, the Key Manager 152 updates code pages. The master Key Server 156 regenerates code pages without the key containers that have expired and have been disposed of. A new code page is generated that has a different generation number. The new generation number is then downloaded to the Key Manager 152. The original code pages can be maintained on the customer system until the customer regenerates the encryption database. This is typically done on a monthly basis.

Once a month, the entire set of code pages 154 can be loaded from the DAS 140 and re-enciphered with the new masker key which has been loaded. The previous master key is destroyed or locked away. Once the previous master key is destroyed, the cryptographic key scrubbing is complete. The Key Manager 152 can download the updated generation of the code pages and the system continues to operate as before. The Key Manager 152 keeps a key cache allowing it to operate while the code pages are regenerated without system interruption.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A computer-implemented method of storing data files, comprising:
    receiving data files for storage;
    serializing the files by assigning an associative serial number to each file;
    creating an associative cryptographic hash of each file;
    generating a first list of the serialized associative cryptographic hashes of the received files;
    closing the first list after a predetermined time interval;
    determining an associative cryptographic hash of the closed first list;
    storing the closed list in a first storage;
    iteratively generating, closing, and storing subsequent lists of serialized associative cryptographic hashes of received files, wherein the first element of each subsequent list is the associative cryptographic hash of the last closed list;
    re-computing the associative cryptographic hash of a closed list;

verifying the authenticity of a closed list by comparing the recorded associative cryptographic hash of the closed list in a subsequent list to the re-computed cryptographic hash of the closed list; and reporting an error when the comparison indicates a mismatch.

2. The computer-implemented method of claim 1, wherein the lists are closed after a predetermined number of associative cryptographic hashes have been recorded.

3. The computer-implemented method of claim 1, further comprising: periodically storing the closed lists in a second storage for verification.

4. The computer-implemented method of claim 3, further comprising:

re-computing the associative cryptographic hash of a list stored in the second storage;

verifying the authenticity of the list in the second storage, by comparing the recorded associative cryptographic hash of the list in a subsequent list to the re-computed associative cryptographic hash of the list; and reporting an error when the comparison indicates a mismatch.

5. The computer-implemented method of claim 1, further comprising:

encrypting at least one of the files received for storage with an encryption key, recording a record of the serial number of the encryption key used and the associated cryptographic hash of the at least one file in a key manager.

6. The computer-implemented method of claim 1 further comprising: generating unique encryption keys in a key server; obtaining the unique encryption key from the key server for encrypting the at least one of the files received for storage; and recording the record of the serial number of the encryption key used and the associated cryptographic hash of the at least one file in the key server.

7. The computer-implemented method of claim 1 further comprising: assigning a minimum retention date and expiry date for each file received for storage; generating a list of stored files ready for deletion according to the minimum retention date and expiry date; and deleting the stored files and their associative parts in the list upon approval.

* * * * *

UNITED STATES PATENT AND TRADEMARK OFFICE
CERTIFICATE OF CORRECTION

PATENT NO. : 8,086,578 B2  
APPLICATION NO. : 12/851824  
DATED : December 27, 2011  
INVENTOR(S) : Thomas F. Gosnell Page 1 of 1

It is certified that error appears in the above-identified patent and that said Letters Patent is hereby corrected as shown below:

Column 22, claim 6, line 8, delete "claim 1" and insert therefor -- claim 5 --

Signed and Sealed this  
Twenty-first Day of February, 2012

David J. Kappos  
*Director of the United States Patent and Trademark Office*